US008380458B2

(12) United States Patent
Wengler (10) Patent No.: US 8,380,458 B2
(45) Date of Patent: Feb. 19, 2013

(54) IN FLIGHT DETECTION (75) Inventor: Michael James Wengler, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 215 days.

(21) Appl. No.: 12/727,050

(22) Filed: Mar. 18, 2010

(65) Prior Publication Data

US 2011/0125454 A1 May 26, 2011

Related U.S. Application Data (60) Provisional application No. 61/263,246, filed on Nov. 20, 2009.

(51) Int. Cl.
*G01P 15/00* (2006.01)
*G01C 17/38* (2006.01)
*H04M 11/04* (2006.01)
(52) U.S. Cl. .................. 702/141; 73/1.78; 455/404.2
(58) Field of Classification Search .................. 702/141, 702/33–35, 81, 84–85, 89–90, 94–95, 104–105, 702/127, 150–153, 179, 182–183, 185, 189, 702/193, 199; 73/1.37–1.38, 1.75–1.79, 73/178 R, 382 G, 488, 503, 514.01–514.02, 73/514.15; 33/316, 324, 328; 701/1, 14; 455/127.5, 404.2, 418, 431, 456.1, 457, 550.1
See application file for complete search history.

(56) References Cited

U.S. PATENT DOCUMENTS

2008/0081656 A1* 4/2008 Hiles .......................... 455/550.1

FOREIGN PATENT DOCUMENTS

WO WO2009012522 A1 1/2009

OTHER PUBLICATIONS

Baziw et al., In-Flight Alignment and Calibration of Inertial Measurement Units—Part I: General Formulation, Jul. 1972, IEEE Transactions on Aerospace and Electronic Systems, vol. AES-8, No. 4, pp. 439-449.*
International Search Report and Written Opinion—PCT/US2010/057505—ISA/EPO—Apr. 4, 2011.

* cited by examiner

*Primary Examiner* — Toan Le (57) ABSTRACT

An apparatus and method for detecting whether a mobile device is in flight based on sensor measurements from a 3-dimensional accelerometer are presented. For example, embodiments estimate a direction of gravity and non-gravity acceleration, separate this non-gravity acceleration into a vertical and horizontal components, then test the estimated accelerations to determine whether the mobile device is experiencing sufficient vertical acceleration to warrant an in-flight determination.

23 Claims, 9 Drawing Sheets

IN FLIGHT DETECTION

RELATED APPLICATIONS

This application claims the benefit of and priority to U.S. Provisional Application No. 61/263,246, filed Nov. 20, 2009, titled "In Flight Detection" by inventor Michael James Wengler, which is expressly incorporated herein by reference.

FIELD

This disclosure relates generally to apparatus and methods for detecting when a mobile device is in flight. More particularly, the disclosure relates to detecting that a mobile device is in flight based on sensor measurements (e.g., from a 3-dimensional accelerometer sensor).

BACKGROUND

Most new mobile devices offer an in-flight mode, which allows a user to operate the mobile device while flying above 10,000 ft. The user manually should enable the in-flight mode when boarding a plane and may disable the in-flight mode once the plane has landed. The in-flight mode control availability of all radio features (e.g., cellular voice/data, WiFi, Bluetooth) in the mobile device. Currently, a mobile device cannot detect whether it is in flight so cannot not automatically disable or enable its in-flight mode setting.

SUMMARY OF THE DISCLOSURE

Disclosed is an apparatus and method for detecting if a mobile device is in flight based on sensor measurements from a 3-dimensional accelerometer. Some embodiments estimate a direction of gravity and non-gravity acceleration, separate this non-gravity acceleration into a vertical and horizontal components, then test the estimated accelerations to determine whether the mobile device is experiencing sufficient vertical acceleration to warrant an in-flight determination.

According to some aspects, disclosed is a method, in a mobile device, for in-flight detection, the method comprising: providing two acceleration indicators $\{A_{i-1}, A_i\}$; determining a difference acceleration ($d\hat{A}$) between the two acceleration indicators $\{A_{i-1}, A_i\}$; splitting the difference acceleration ($d\hat{A}$) into orthogonal components comprising an estimated horizontal acceleration ($d\hat{A}_H$) and an estimated vertical acceleration ($d\hat{A}_V$) based on an estimated direction of gravitational acceleration; comparing an acceleration comprising a vertical acceleration with a first threshold ($Th_1$) to determine a first comparison result; comparing at least one of the orthogonal components $\{d\hat{A}_H, d\hat{A}_V\}$ with a second threshold ($Th_2$) to determine a second comparison result; and setting an in-flight indicator based on the first and second comparison results.

According to some aspects, disclosed is a mobile device for in-flight detection, the device comprising: an accelerometer providing raw samples; an averager coupled to the accelerometer to receive the raw sample and provide averaged samples; a delay T unit coupled to the averager to receive the averaged samples; a difference unit coupled to the averager and the delay T unit to compute and provide a difference acceleration; a gravity direction estimator coupled to the accelerometer to provide an estimate of a direction of gravity; a vector splitter coupled to the difference unit and gravity direction estimator to find a vertical component and a horizontal component of the difference acceleration; a first comparator coupled to a first threshold and coupled to the vector splitter to receive the vertical component and to provide a first comparison result; a second comparator coupled to the vector splitter to receive the vertical component and the horizontal component and to provide a second comparison result; and a logic gate coupled to the first and second comparators to process the first and second comparison results into an in-flight indicator.

According to some aspects, disclosed is a mobile device for in-flight detection, the device comprising: means for providing two acceleration indicators $\{A_{i-1}, A_i\}$; means for determining a difference acceleration ($d\hat{A}$) between the two acceleration indicators $\{A_{i-1}/A_i\}$; means for splitting the difference acceleration ($d\hat{A}$) into orthogonal components comprising an estimated horizontal acceleration ($d\hat{A}_H$) and an estimated vertical acceleration ($d\hat{A}_V$) based on an estimated direction of gravitational acceleration; means for comparing an acceleration comprising a vertical acceleration with a first threshold ($Th_1$) to determine a first comparison result; means for comparing at least one of the orthogonal components $\{d\hat{A}_H, d\hat{A}_V\}$ with a second threshold ($Th_2$) to determine a second comparison result; and means for setting an in-flight indicator based on the first and second comparison results.

According to some aspects, disclosed is a computer-readable medium including program code stored thereon, comprising program code to: provide two acceleration indicators $\{A_{i-1}, A_i\}$; determine a difference acceleration ($d\hat{A}$) between the two acceleration indicators $\{A_{i-1}, A_i\}$; split the difference acceleration ($d\hat{A}$) into orthogonal components comprising an estimated horizontal acceleration ($d\hat{A}_H$) and an estimated vertical acceleration ($d\hat{A}_V$) based on an estimated direction of gravitational acceleration; compare an acceleration comprising a vertical acceleration with a first threshold ($Th_1$) to determine a first comparison result; compare at least one of the orthogonal components $\{d\hat{A}_H, d\hat{A}_V\}$ with a second threshold ($Th_2$) to determine a second comparison result; and set an in-flight indicator based on the first and second comparison results.

According to some aspects, disclosed is a device comprising a processor and a memory wherein the memory includes software instructions to: provide two acceleration indicators $\{A_{i-1}, A_i\}$; determine a difference acceleration ($d\hat{A}$) between the two acceleration indicators $\{A_{i-1}, A_i\}$; split the difference acceleration ($d\hat{A}$) into orthogonal components comprising an estimated horizontal acceleration ($d\hat{A}_H$) and an estimated vertical acceleration ($d\hat{A}_V$) based on an estimated direction of gravitational acceleration; compare an acceleration comprising a vertical acceleration with a first threshold ($Th_1$) to determine a first comparison result; compare at least one of the orthogonal components $\{d\hat{A}_H, d\hat{A}_V\}$ with a second threshold ($Th_2$) to determine a second comparison result; and set an in-flight indicator based on the first and second comparison results.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Figure 1A:
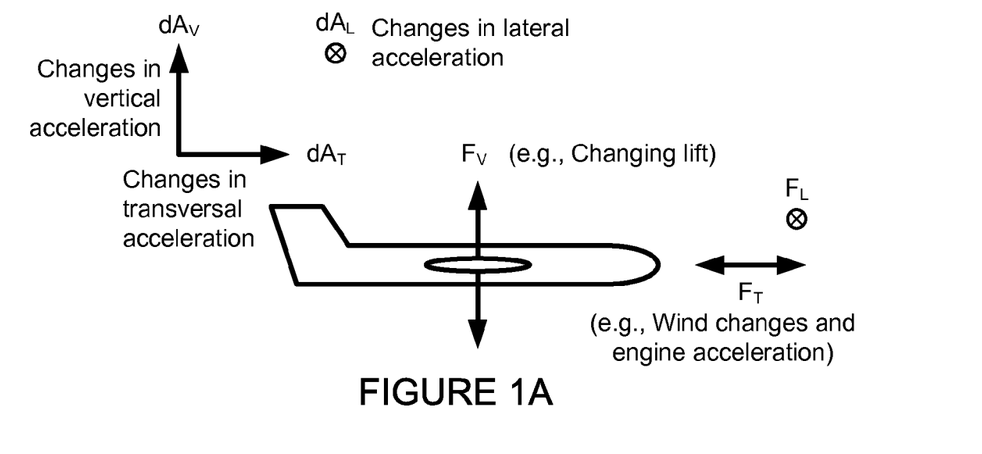
FIG. 1A shows forces acting on an airplane in flight.

FIG. 1A shows forces acting on an airplane in flight. A change in acceleration, represented by dA, may be computed as a difference between an instantaneous total acceleration A and a gravitational constant $A_G$ (or $dA=A-A_G$). The change in acceleration dA may also be represented by a three-dimensional vector, with components in each of the transversal-lateral-vertical (T-L-V) cardinal directions with respect to gravity, as $dA=(A-A_G)=(A_T+A_L+A_V)-A_G$, or, equivalently, $dA=(A_T+A_L)+(A_V-A_G)$, where $A_T$ is the instantaneous transversal acceleration, $A_L$ is the instantaneous lateral acceleration, and $A_V$ is the instantaneous vertical acceleration. Note, the vertical acceleration $A_V$ is parallel to the pull of gravity $A_G$. The change in acceleration dA may similarly be represented by a three-dimensional vector, with components in each of the X-Y-Z cardinal directions with respect to the housing of a mobile device, as $dA=(A-A_G)=(A_X+A_Y+A_Z)-A_G$, where $A_X$ is the instantaneous X-axis acceleration, $A_Y$ is the instantaneous Y-axis acceleration, and $A_Z$ is the instantaneous Z-axis acceleration. In this reference system, the vertical acceleration $A_Z$ with respect to the mobile device is not likely parallel to the pull of gravity $A_G$.

During flight, an aircraft experiences both variable vertical forces ($F_V$), transversal forces ($F_T$) and lateral forces ($F_L$). Changing vertical forces include varying lift and vertical winds, which lead to vertical displacement and acceleration in line with the pull of gravity. Even while set to cruise at a specific altitude, an airplane rises and falls from tens of feet to hundreds of feet leading to acceleration in addition to acceleration due to the Earth's gravity. Changing horizontal forces (transversal and lateral forces) include varying headwinds and crosswinds as well has changes in engine RPMs and propeller or turbine angles. A change in vertical acceleration is represented by $dA_V$, a change in transversal acceleration is represented by $dA_T$, and a change in lateral acceleration is represented by $dA_L$. A sum of the transversal acceleration ($dA_T$) and the lateral acceleration ($dA_L$) is the horizontal acceleration (represented by $dA_H$).

Typically, a cruising airplane experiences less variance in transversal acceleration than variance in vertical acceleration. That is, changes in acceleration due to variable lift is greater than changes in acceleration due to variable headwinds. A mobile device within an airplane may use sensor measurements from an accelerometer to measure acceleration. The mobile device may decompose this acceleration into estimated vertical and transversal vectors to determine whether variance in vertical acceleration is great enough to warrant an in-flight determination.

Figure 1B:
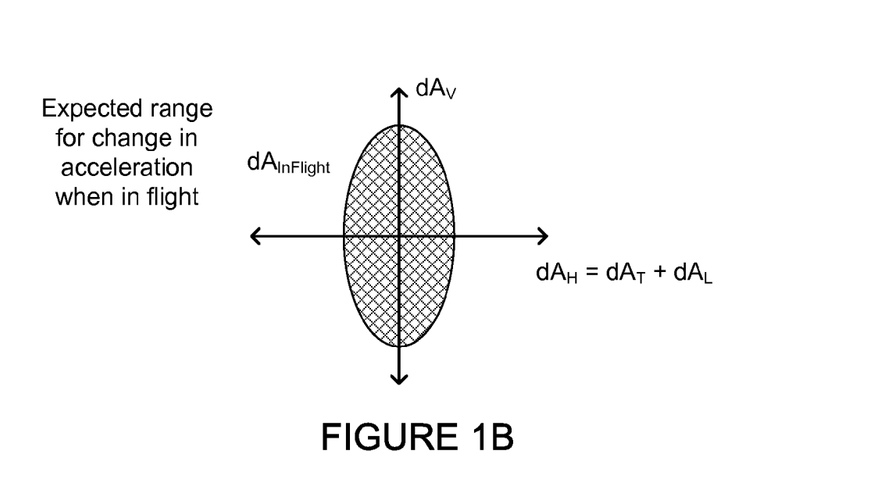
FIGS. 1B and 1C illustrate expected changes in acceleration due to flight and non-flight motion.
Figure 1C:
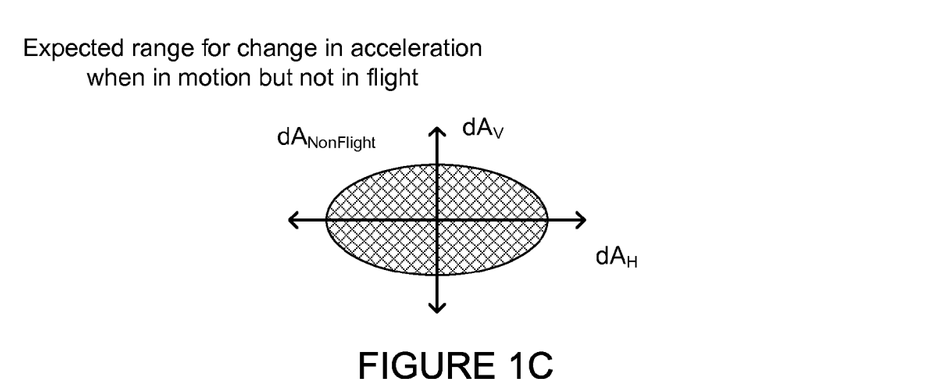

FIGS. 1B and 1C illustrate expected changes in acceleration due to flight and non-flight motion. In FIG. 1B, the area within the ellipse standing up represents expected changes in acceleration (referred to as a difference acceleration represented by dA) while in flight. The ellipse has a longer major axis vertically aligned with the pull of gravity and a shorter minor axis in line with an airplane's transversal motion. The orientation of this ellipse indicates that a cruising airplane experiences larger variations in vertical acceleration ($dA_V$) than in horizontal acceleration (transversal-plus-lateral acceleration $dA_H=dA_{TL}=dA_T+dA_L$). Averaging the separate magnitudes of $dA_V$ and $dA_H$ will resulted in $\Sigma|dA_V|$ being larger than $\Sigma|dA_H|$. Thus, if $\Sigma|dA_V|>\Sigma|dA_H|$, then the mobile device is more likely in flight.

On the contrary, in FIG. 1C, an ellipse on its side is shown for an expected range for changes in acceleration when in motion but not in flight. In the case of non-flight motion, the variance of vertical acceleration is typically much less than the variance of transversal acceleration. That is, if $\Sigma|dA_V|<\Sigma|dA_H|$, then the mobile device is more likely not in flight.

Figure 2:
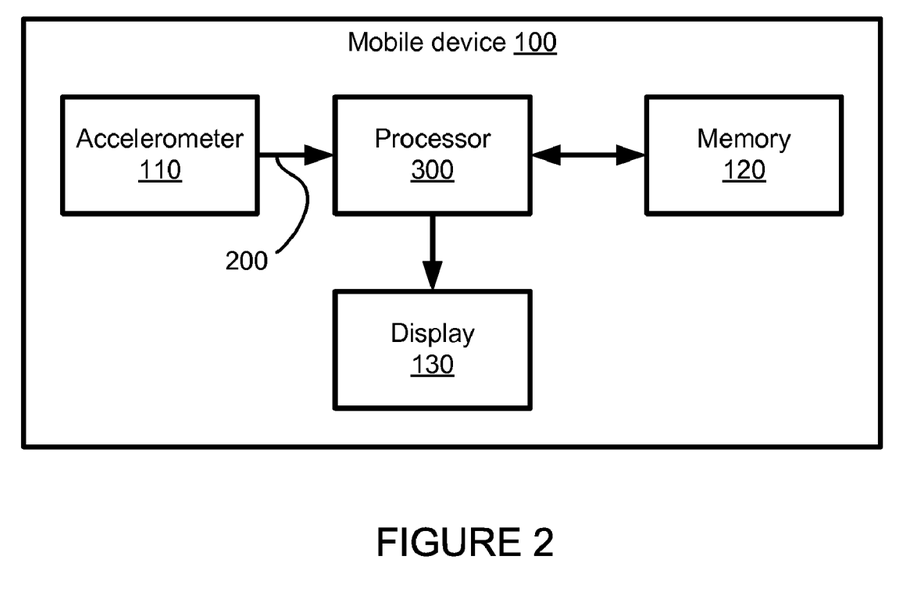
FIG. 2 shows a mobile device, in accordance with some embodiments of the present invention.

FIG. 2 shows a mobile device, in accordance with some embodiments of the present invention. The mobile device 100 includes a processor 300 and an accelerometer 110 as well as optional memory 120 and an optional display 130. The accelerometer 110 provides samples 200 representing measured acceleration experienced by the mobile devices 100. The processor 300 converts and analyzes the samples 200 to determine whether the mobile device 100 is in flight or not in flight. Once the processor 300 determines the in-flight status, the processor 300 may store an updated status into memory 120 and/or or present the status to the user on the display 130. The processor 300 may be implemented with a general-purpose microprocessor, a RISC processor, a microcontroller, a programmable logic device, dedicated logic gates or the like.

Figure 3:
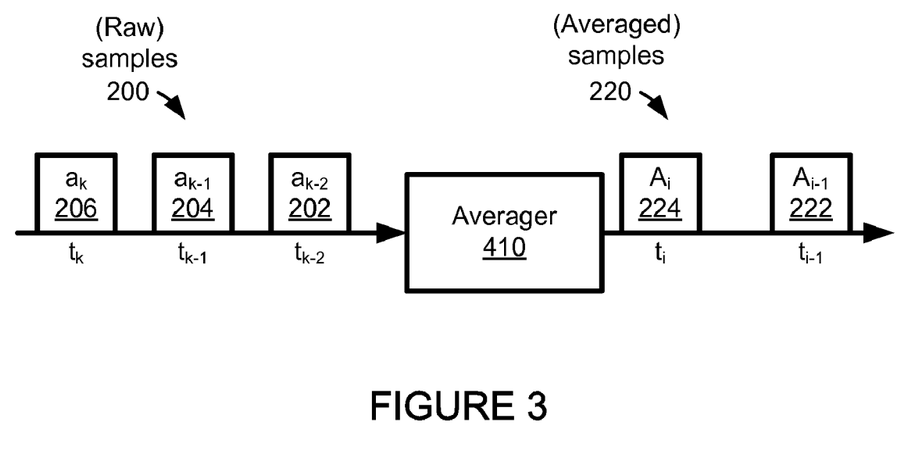
FIG. 3 shows a first sequence of raw samples entering an averager and averaged samples exiting the averager, in accordance with some embodiments of the present invention.

FIG. 3 shows a first sequence of raw samples entering an averager and averaged samples exiting the averager, in accordance with some embodiments of the present invention. The accelerometer 110 provides noisy raw accelerometer samples 200 { . . . , $a_{k-2}$ 202, $a_{k-1}$ 204, $a_k$ 206, . . . } to the averager 410. The accelerometer 110 generates samples, typically at a sub-second rate { . . . , $t_{k-2}, t_{k-2}, t_k$, . . . }, to indicate the acceleration experienced by the mobile device 100 over the sub-second period of time between two successive samples. The averager 410 sums a fixed number of raw samples to produce each averaged sample 220 {..., $A_{i-1}$ 222, $A_i$ 224, ...}, typically at a super-second rate {..., $t_{i-1}$, $t_i$ ...}, where $(t_i-t_{i-1})\gg(t_k-t_{k-1})$. The averager 410 may implement an averager as a sum or a scaled sum. By collecting a sequence of values, the averager 410 produces a low-noise approximation of the actual acceleration over the averaging period ($t_i$, $t_{i-1}$).

In some embodiments, raw samples 200 are produced at 30 Hz (i.e., $t_k-t_{k-1}$ equals approximately 33 milliseconds) and the averaged samples 220 are produced at 0.2 Hz (i.e., $t_i-t_{i-1}$ equals approximately 5 seconds). In this embodiment, the averager 410 sums acceleration measurements (raw samples 200) and results in a low-noise approximation for the acceleration over the 5-second averaging period.

Figure 4:
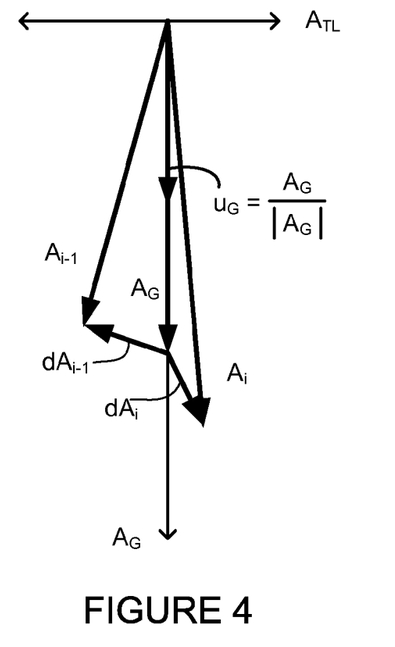
FIGS. 4, 5 and 6 each show two acceleration vectors and various reference and difference vectors, in accordance with some embodiments of the present invention.
Figure 5:
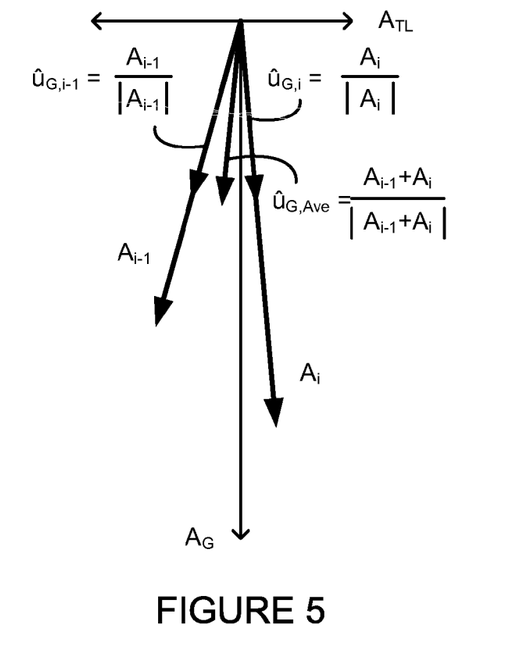
Figure 6:
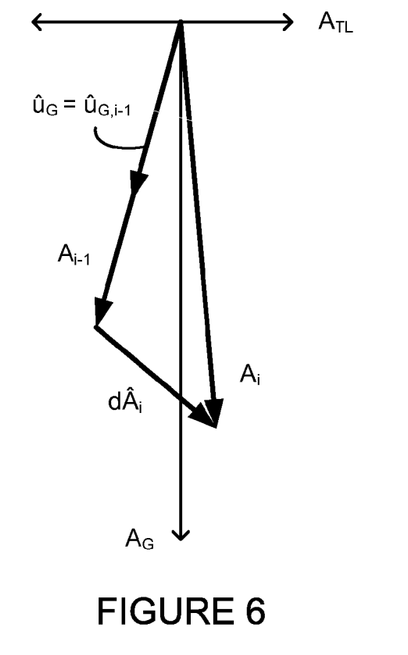

FIGS. 4, 5 and 6 each show two acceleration vectors and various reference and difference vectors, in accordance with some embodiments of the present invention. Hereinafter, the acceleration vectors due to gravity are shown inverted for simplicity.

In FIG. 4, two averaged samples ($A_{i-1}$ and $A_i$) are depicted as vectors relative to a vector representing the pull due to gravity ($A_G$). A unit vector in the direction of gravity may be shown as vector $u_G=A_G/|A_G|$. A difference between vectors $A_{i-1}$ and $A_G$ is shown as vector $dA_{i-1}$ and a corresponding difference between vectors $A_i$ and $A_G$ is shown as vector $dA_i$. Vector $dA_{i-1}$ shows acceleration that the mobile device 100 experienced during a period ending at time $t_{i-1}$. Vector $dA_i$ shows acceleration that the mobile device 100 experienced during a next period ending at time $t_i$. Vector $dA_{i-1}$ (pointing mostly to the left) is shown as containing mostly acceleration in the horizontal plane (combined lateral and transversal acceleration). Vector $dA_i$ (pointing mostly downward) shows the mobile device 100 experienced more vertical acceleration than horizontal acceleration. The acceleration component of $dA_i$ in the direction of gravity may be computed as a projection $dA_V=\text{Proj}_u(dA_i)=(|dA_i|\cos\phi)u_G$, where $\phi$ represents the angle between vectors $dA_V$ and $u_G$, or as a dot product as $dA_V=|dA_i \cdot A_G|A_G/|A_G|^2$. This component of $A_i$, represented by $dA_V$ (not shown), identifies the vertical acceleration of the mobile device 100 that is not due to gravity. Similarly, the non-vertical component of $A_i$, represented by $dA_{TL}$ or $dA_H$ (not shown), identifies the horizontal acceleration (in the transversal and lateral directions) of the mobile device 100.

Within the reference frame of an airplane experiencing changes in altitude and velocity, the direction of the gravity vector $A_G$ is estimated. An estimated direction of gravity may be represented by an estimated gravity vector $\hat{A}_G$ or a corresponding estimated unit vector $\hat{u}_G=\hat{A}_G/|\hat{A}_G|$ This estimated gravity vector $\hat{A}_G$ may be computed is several different ways.

FIG. 5 shows an example of three different vectors that may be used to estimate the vector $A_G$ and its corresponding unit vector $u_G$. As a first example, the estimated vector $\hat{A}_G$ is set to $A_{i-1}$, resulting in an estimated unit vector $\hat{u}_{G,i-1}=A_{i-1}/|A_{i-1}|$. As a second example, the estimated vector $\hat{A}_G$ is set to $A_i$, resulting in an estimated unit vector $\hat{u}_{G,i}=A_i/|A_i|$. As a third example, the estimated vector $\hat{A}_G$ is set to an average of $A_{i-1}$ and $A_i$, resulting in an estimated unit vector $\hat{u}_{G,Ave}=(A_{i-1}+A_i)/|A_{i-1}+A_i|$. As a forth example (not shown), the estimated vector $\hat{A}_G$ is set to an average of at least three averaged vectors (e.g., $\{A_{i-3}, A_{i-2}, A_{i-1}\}$). As a fifth example (not shown), the estimated vector $\hat{A}_G$ is set to a weighted combination of two or more previous averaged vectors $\{A_i, A_{i-1}, \ldots\}$ resulting in an estimated unit vector $\hat{u}_{G,Weighted}$. The appropriate estimated value for $A_G$ or $u_G$ may be used in the projection formula above to compute the vertical and non-vertical components of $A_{i-1}$ and/or $A_i$.

FIG. 6 shows the case where $A_{i-1}$ is used to estimate the vector $A_G$. The resulting estimated vector $\hat{A}_G=A_{i-1}$ is used to determine an estimated $\hat{u}_{G,i-1}$ (or simply $\hat{u}_G$). The difference vector dA is denoted as estimated vector $d\hat{A}$ (which represents $d\hat{A}_i$ determined at time $t_i$) and is formed from the vector difference between $A_{i-1}$ and $A_i$ (i.e., $d\hat{A}_i=A_i-A_{i-1}$).

Figure 7:
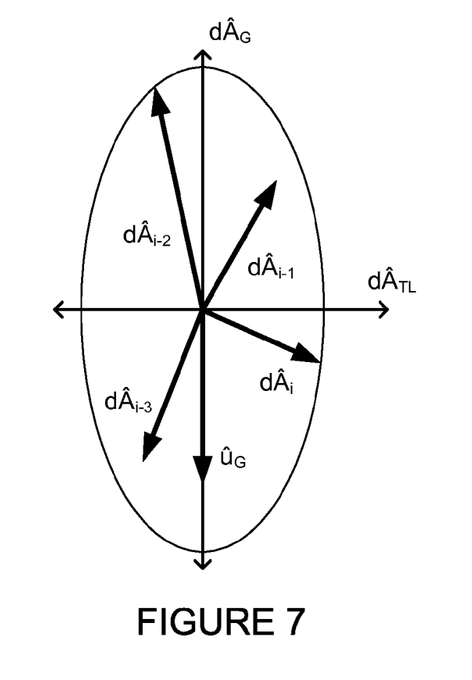
FIG. 7 shows example difference vectors from averaged accelerometer data, in accordance with some embodiments of the present invention.

FIG. 7 shows example difference vectors from averaged accelerometer data, in accordance with some embodiments of the present invention. A sequence of four example estimated difference vectors (difference acceleration) are shown $\{d\hat{A}_i, d\hat{A}_{i-1}, d\hat{A}_{i-2}, d\hat{A}_{i-3}\}$ spaced generally within an ellipse. The estimated difference vector from FIG. 6 is shown here as $d\hat{A}_i$. If a series of estimated difference vectors $\{d\hat{A}\}$ forms an upright ellipse, as shown in FIG. 1B, this sequence of acceleration averaged accelerometer data represents the mobile device 100 is more likely in flight. Alternatively, the estimated difference vectors may form an ellipse on its side (as shown in FIG. 1C), which would represent the mobile device 100 is in motion but not in flight.

Figure 8A:
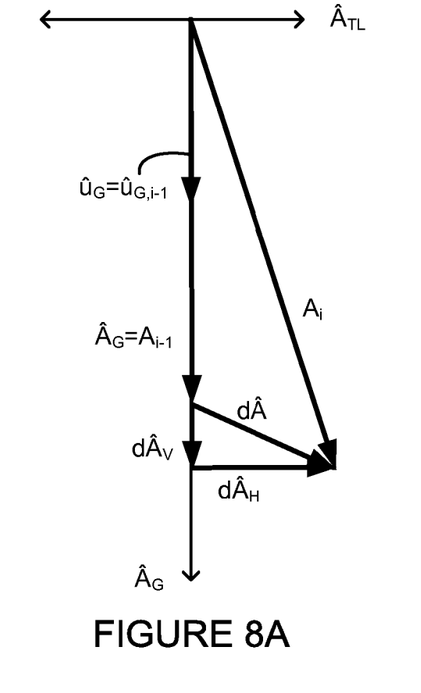
FIGS. 8A and 8B show ways to compute a difference vector based on assumptions for a gravitational vector, in accordance with some embodiments of the present invention.
Figure 8B:
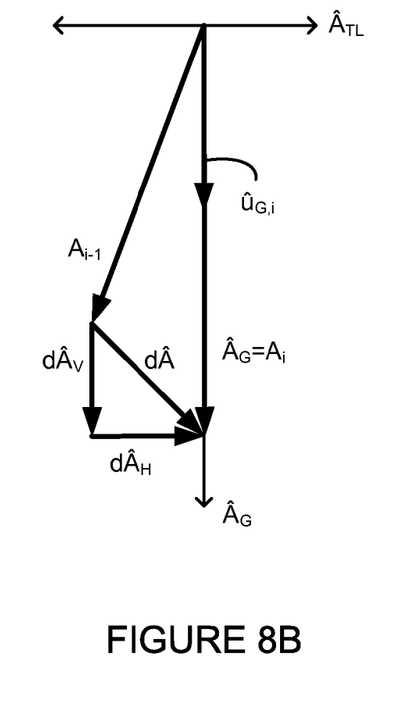

FIGS. 8A and 8B show ways to compute a difference vector based on assumptions for a gravitational vector, in accordance with some embodiments of the present invention.

FIG. 8A shows when reference vector $A_G$ is unknown, the averaged acceleration vector $A_{i-1}$ is used to best estimate the vector $A_G$ ($\hat{A}_G$), and $A_{i-1}$ is similarly used to defined $\hat{u}_G$. In addition, the estimated difference vector $d\hat{A}$ is decomposed into an estimated vertical component $d\hat{A}_V$ and an estimated horizontal component $d\hat{A}_H$. FIG. 8B shows an alternatively embodiment where the averaged acceleration vector $A_i$ is used to the estimated vector $\hat{A}_G$ and to find $\hat{u}_G$. Again, the estimated difference vector $d\hat{A}$ is decomposed into an estimated vertical component $d\hat{A}_V$ and an estimated horizontal component $d\hat{A}_H$. A sequence of averaged measurements 220 $\{A_i, A_{i-1}, \ldots\}$ may be observed to determine whether the sequence forms an ellipse standing up or on its side. Alternatively, a single difference vector may be used to indicate whether motion represents in-flight motion.

Figure 9A:
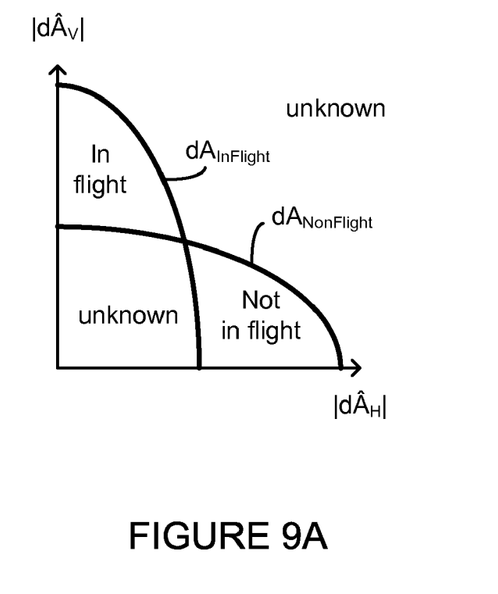
FIGS. 9A, 9B, 9C and 9D illustrate Venn diagrams showing tests and decisions, in accordance with some embodiments of the present invention.
Figure 9B:
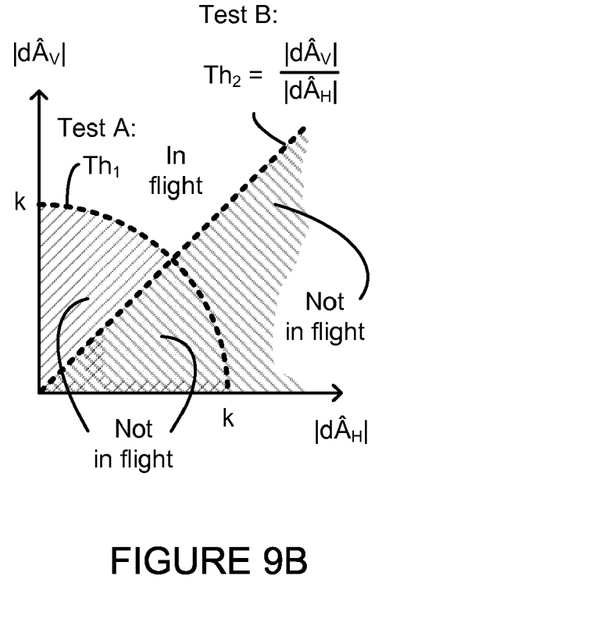
Figure 9C:
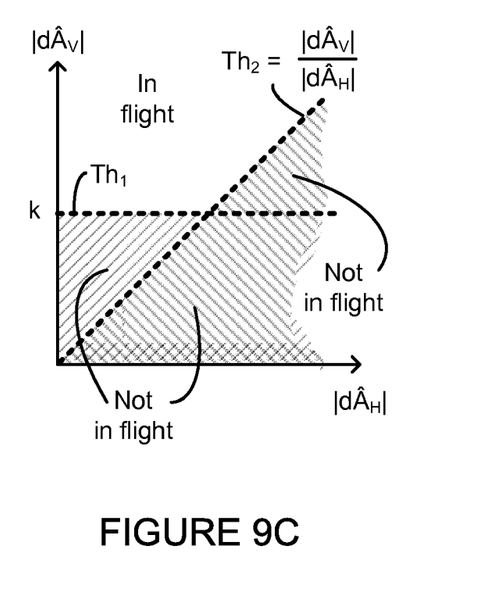

FIGS. 9A, 9B and 9C illustrate Venn diagrams showing tests and decisions, in accordance with some embodiments of the present invention. Each of the diagrams represents two test performed on the difference vector $d\hat{A}$ and/or one or two estimated components of the difference vector. The vertical axis, labeled $|d\hat{A}_V|$, represents a change in a magnitude of an estimated vertical acceleration, and the horizontal axis, labeled $|d\hat{A}_H|$, represents a change in a magnitude of an estimated horizontal acceleration.

FIG. 9A, shows the positive quadrant of the ellipses of FIGS. 1B and 1C, wherein the negative quadrants are flipped into the positive quadrant. The first ellipse represents an area where a change in in-flight acceleration ($dA_{InFlight}$) is expected. The second ellipse represents an area where a change in non-in-flight acceleration ($dA_{NonFlight}$) is expected. In a first area where the difference vector is within an area defined by the overlapping ellipses, it may be unknown whether that difference vector dA represents in-flight or non-flight motion. In a second area where the difference vector dA is within an area defined by just the ellipse on its side, it may more probable that difference vector dA represents non-flight motion. In a third area where the difference vector is within an area defined by just the standing up ellipse, it may more probable that difference vector represents in-flight motion. In a forth area, outside of both ellipses, it may be unknown whether that difference vector dA represents in-flight or non-flight motion. To push the difference acceleration into the in-flight area or the non-in-flight area, the processor may accumulate or average the estimated difference vectors $d\hat{A}$ over time. For example, an accumulated value $\Sigma|d\hat{A}|$ over the last N estimates (or an averaged value $\Sigma|d\hat{A}|/N$ for the last N estimates) may be used in the comparison test described herein.

Several tests may be defined what an estimated difference vector dA (or a sequence of estimated difference vectors) represents. For example, test(s) may conclude that a particular estimated difference may represent: (1) in-flight motion or not in-flight motion; (2) in-flight motion, non-flight motion or indeterminate; (3) not non-flight motion or non-flight motion; or (4) in-flight motion, non-flight motion or unknown. For example, a first test determines if the difference vector dA is outside of an unknown area and a second test determines if the difference vector dA is within the in-flight ellipse.

In FIG. 9B, a first test uses a magnitude of the difference vector $d\hat{A}$ (represented as $|d\hat{A}|$) to determine whether acceleration is above a first threshold value $Th_1$. That is, if $|d\hat{A}|>Th_1$ (for example, $|d\hat{A}|>Th_1=0.0002$ where 1.0000 represents 1 G or the acceleration due just to gravity at sea level), then the test result is positive. This positive result represents that the difference acceleration may be due to in-flight motion. A second test compares a magnitude of the vertical component of the deference vector $d\hat{A}_V$ (represented as $|d\hat{A}_V|$) to a magnitude of the horizontal component of the deference vector $d\hat{A}_H$ (represented as $|d\hat{A}_H|$) to a second threshold $Th_2$. For example, a ratio of the components $|d\hat{A}_V|/|d\hat{A}_H|$ is compared to the second threshold $Th_2$. Alternatively, the second test may be a comparison between a magnitude of a first component and a scaled value of a second component. If the second threshold $Th_2=1$, the second test may be a simple comparison between the components ($|d\hat{A}_V|>|d\hat{A}_H|$). If ($|d\hat{A}_V|/|d\hat{A}_H|>Th_2$) or ($|d\hat{A}_V|>|d\hat{A}_H|$), then the test result is positive. If the first test and second test both result in a positive result, the mobile device 100 indicates it is under in-flight motion.

In FIG. 9C, a first test uses a magnitude of the difference vector $d\hat{A}_V$ (represented as $|d\hat{A}_V|$) to determine whether acceleration is above a first threshold value $Th_1$. That is, $|d\hat{A}_V|>Th_1$, for example, $|d\hat{A}|>Th_1=0.0002$. A second test, as described above with reference to FIG. 9A, is also performed. Similarly, if the first test and second test both result in a positive result, the mobile device 100 is considered to be in flight.

Figure 9D:
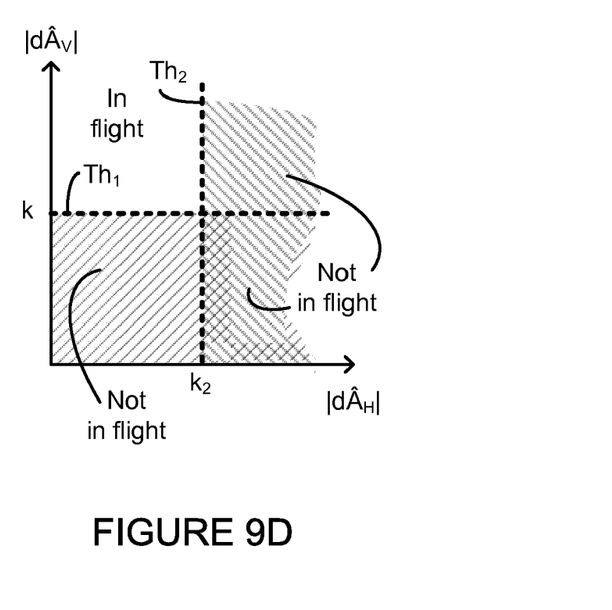

In FIG. 9D, a first test in performed as described above with reference to FIG. 9B. A second test compares the magnitude of the transversal component of the estimated difference vector (represented as $|d\hat{A}_H|$) to a second threshold $Th_2$ (e.g., $|d\hat{A}_H|>Th_2$). This second test limits an in-flight determination to occur when the vertical component is greater than $Th_1$ but transversal component is less than $Th_2$.

The first and second tests described above are not necessarily performed in order. For example, the second described test may be performed before or concurrently with the first described test. Alternatively, only a single of the two tests may be used to make an in-flight determination. For example, if the first test alone results in a positive result (e.g., $|d\hat{A}_V|>Th_1$), then the mobile device 100 is considered to be in flight. Alternatively, if the second test alone results in a positive result (e.g., $|d\hat{A}_V|>(|d\hat{A}_H|)$, then the mobile device 100 is considered to be in flight.

Figure 10A:
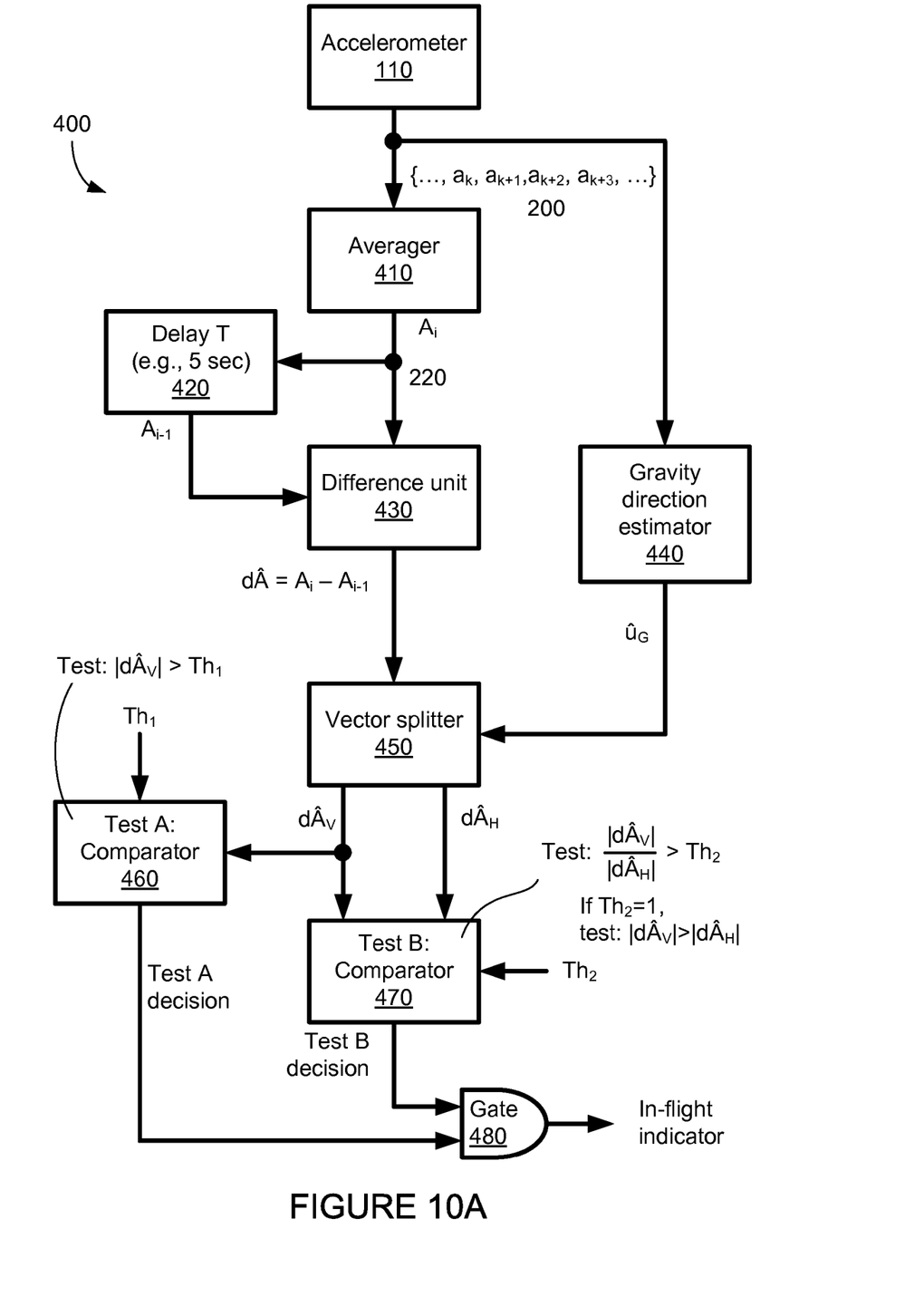
FIGS. 10A, 10B and 11 show modules for in-flight detection in a mobile device, in accordance with some embodiments of the present invention.
Figure 10B:
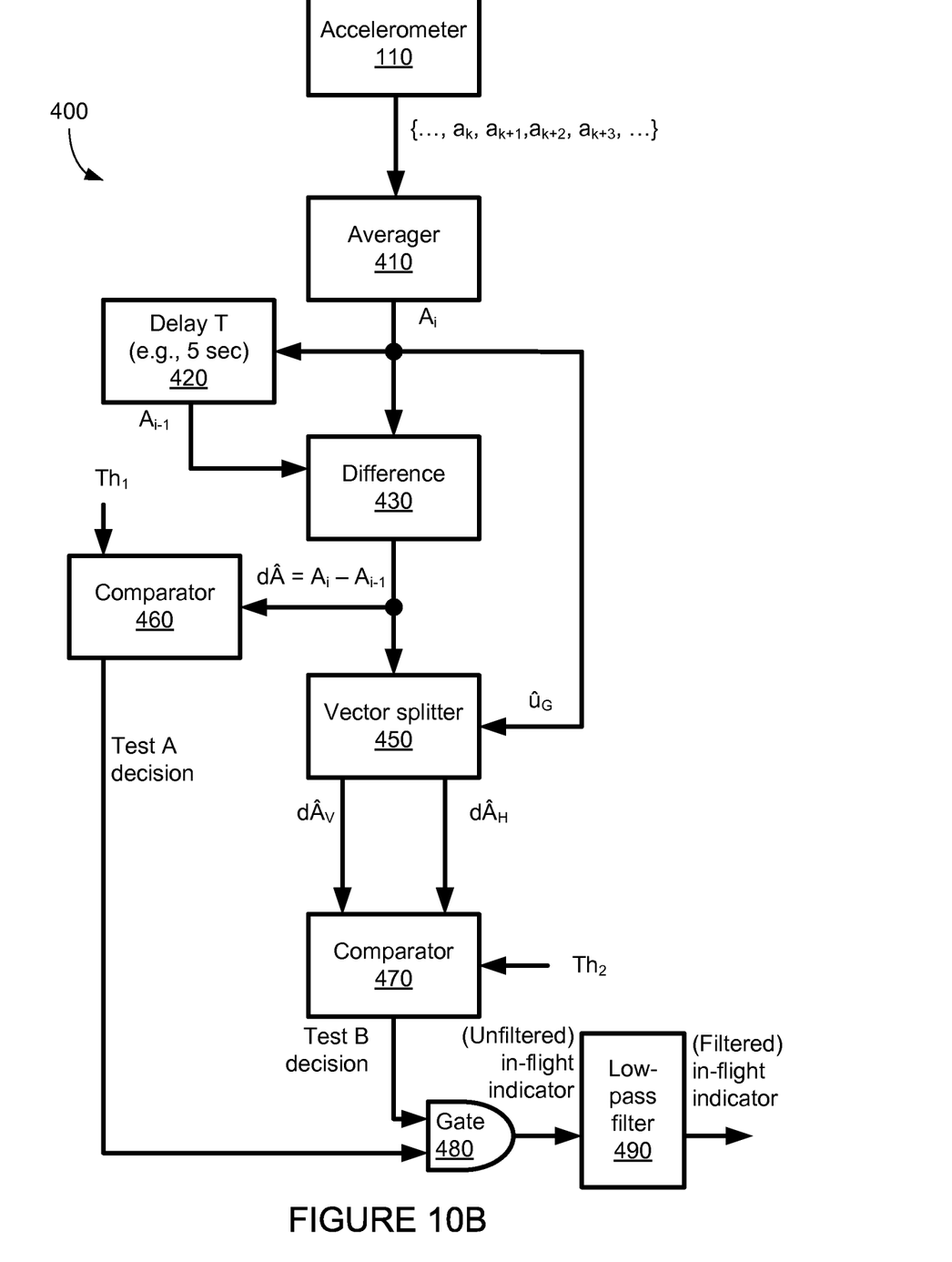
Figure 11:
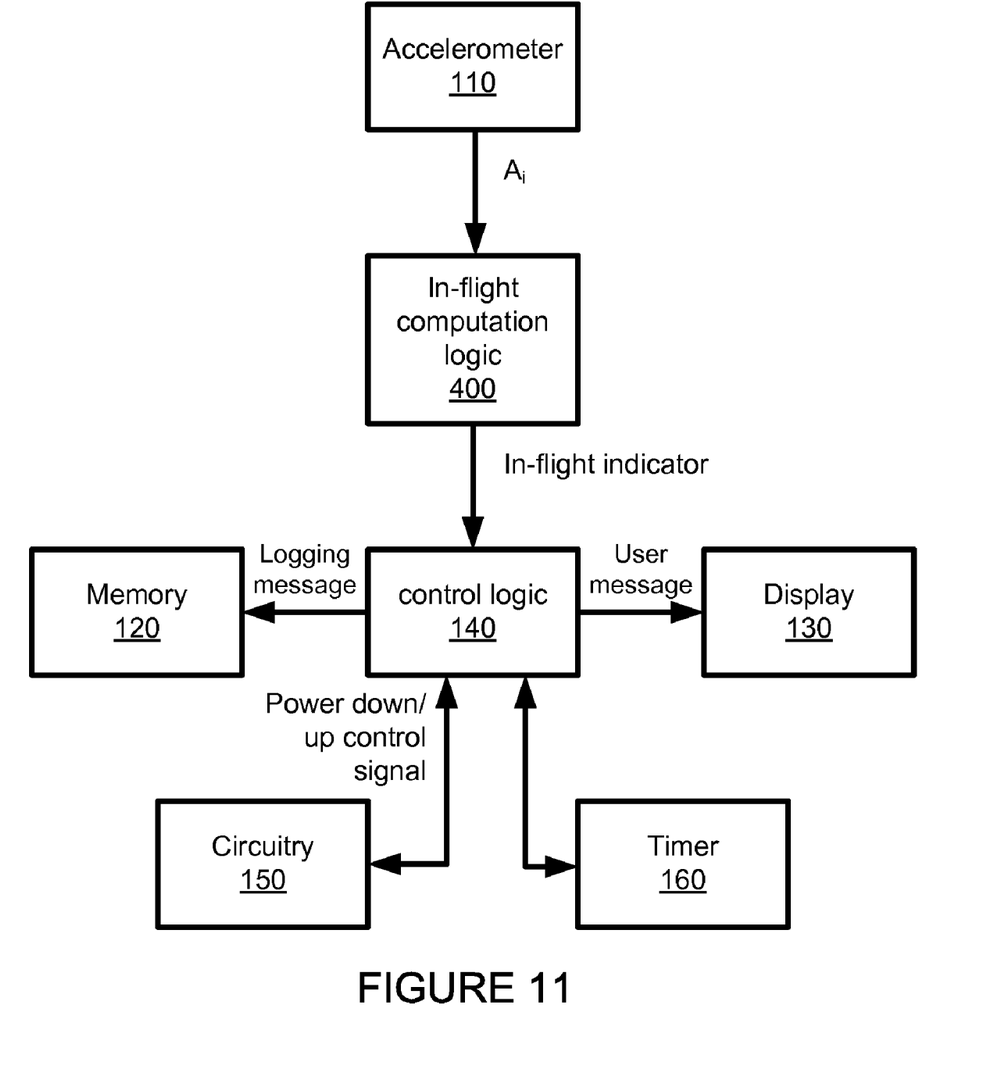

FIGS. 10A, 10B and 11 show modules for in-flight detection in a mobile device, in accordance with some embodiments of the present invention.

In FIG. 10A, an accelerometer 110 provides samples to several modules of in-flight computation logic 400 and results in an in-flight indicator signal. The in-flight computation logic 400 includes an averager 410, a delay T unit 420, a difference unit 430, a gravity direction estimator 440, a vector splitter 450, comparators 460 and 470, and a logic gate 480. If only one test is performed, rather than two or more tests, the comparators 460 and 470 and a logic gate 480 may be replaced by a single comparator 460 (for Test A) or comparator 470 (for Test B).

The accelerometer 110 provides accelerometer samples 200 $\{\ldots, a_{k-2}, a_{k-1}, a_k, \ldots\}$ to the averager 410. In some cases, these raw accelerometer samples 200 are noisy and raw accelerometer samples 200. The averager 410 provides averaged sample $A_i$ 220. In some cases, the averager 410 is incorporated into the accelerometer 110, and the accelerometer 110 provides a series of averaged samples $\{A_i, A_{i-1}\}$ 220. The averager 410 may act as a means for summing a first sequence of two or more sequential accelerometer measurements $\{a_j, a_{j-1}, a_{j-2}, \ldots\}$ 200 and for summing a second sequence of two or more sequential accelerometer measurements $\{a_k, a_{k-1}, a_{k-2}, \ldots\}$ 200 to form the two acceleration indicators $\{A_i, A_{i-1}\}$ 220. Physically, the averager 410 may be a component of or integrated into the accelerometer 110, may be a separate hardware component, or may be a routine running on the processor 300 (e.g., an arithmetic logic unit (ALU), microprocessor or microcontroller). The averager 410 may be a summer, a summer with a divider, or a summer with a shift register. Therefore, the accelerometer 110 and/or the averager 410 are means for providing two acceleration indicators $\{A_i, A_{i-1}\}$ 220. For example, a means for providing two acceleration indicators $\{A_i, A_{i-1}\}$ 220 may be a software adder running on the processor 300 to sum a sequence accelerometer samples 200 $\{\ldots, a_{k-2}, a_{k-1}, a_k, \ldots\}$ for each acceleration indicator ($A_i$). The means for providing two acceleration indicators $\{A_i, A_{i-1}\}$ 220 may also include the accelerometer 110. The period between individual averaged samples $A_i$ 220 is ($t_i-t_{i-1}$), which is typically a magnitude or more than the period between individual raw samples $a_k$ 200, which is ($t_k-t_{k-1}$). For example, the time between averaged samples $A_i$ 220 may be 5 seconds and the time between raw samples $a_k$ 200 may be 33 ms.

In this embodiment, the averager 410 also provides the accelerometer samples 200 to the gravity direction estimator 440. The gravity direction estimator 440 determines a vector to represent a direction of gravity (gravity direction estimate $\hat{u}_G$). Alternatively, the gravity direction estimator 440 accepts averaged samples 220 rather than raw samples 200. In its simplest form, the gravity direction estimator 440 uses a predetermined one of the two most recent raw samples ($a_k$ or $a_{k-1}$) or two most recent averaged samples ($A_i$ or $A_{i-1}$) to represent $u_G$ (e.g., $\hat{u}_G=a_{k-1}$, $\hat{u}_G=a_k$, $\hat{u}_G=A_{i-1}$ or $\hat{u}_G=A_i$, or scaled as $\hat{u}_G=a_{k-1}/|a_{k-1}|$, $\hat{u}_G=a_k/|a_k|$, $\hat{u}_G=A_{i-1}/|A_{i-1}|$ or $\hat{u}_G=A_i/|A_i|$).

Alternatively, the gravity direction estimator 440 uses two (or more) of the most recent sample (e.g., $\hat{u}_G=(A_{i-1}+A_i)/(|A_{i-1}+A_i|)$. Alternatively, the gravity direction estimator 440 uses a three tap or more FIR filter, or a two tap or more IIR filter, to produce $\hat{u}_G$. The output value of the gravity direction estimator 440 is a vector that represents an estimate of the direction of gravity ($\hat{u}_G$ or $\hat{A}_G$).

The output values from the averager 410 are feed to the delay T unit 420, where the delay $T=(t_i-t_{i-1})$. The delay T unit 420 may be a memory location, a register, a software variable or the like for holding the previous output value of the averager 410. In some embodiments, the period between averaged samples is the delay T. This delay and time between averaged samples 220 may be less than 10,000 seconds such as between 1 to 30 seconds (e.g., 5 seconds). In some embodiments, the delay T unit 420 is incorporated within the averager 410.

As described above, the raw sensor measurements 200 and resulting averaged sensor measurements 220 include all acceleration experienced by the mobile device including the acceleration due to gravity. To determine whether the mobile device is in flight, the in-flight computation logic 400 removes an estimate of this acceleration due to gravity. As used herein, $A_i=(A_G+dA)$, where $A_i$ is the total acceleration measured (after averaging), $A_G$ is the gravity vector, and $dA$ is the acceleration experienced by the mobile device without including gravitation. Typically, the actual direction of the acceleration due to gravity $A_G$ is unknown and must be approximated. As a result, $A_i$ also equals the sum $(\hat{A}_G+d\hat{A})$, or equivalently, $d\hat{A}=(A_i-\hat{A}_G)$, where $\hat{A}_G$ is an approximation of the gravity vector $A_G$ and $d\hat{A}$ is an approximation of the acceleration without the gravity vector $A_G$.

The difference unit 430 determines $d\hat{A}$ by removing $\hat{A}_G$ from $A_i$ using the vector operation $d\hat{A}=(A_i-\hat{A}_G)$. The difference unit 430 may be implemented in hardware and/or software. For example, a means for implementing the difference unit 430 may be a software or firmware subtraction operation running in a processor 300, such as in an arithmetic logic unit (ALU), microprocessor, microcontroller or the like. Since vector $A_G$ is typically unknown, the vector is approximated by $\hat{A}_G$, where vector $\hat{A}_G$ is $A_{i-1}$ or as described above. In the case shown, the difference unit 430 approximates the non-gravity acceleration as $\hat{A}_G=A_{i-1}$ so $d\hat{A}=(A_i-\hat{A}_G)$ results in $d\hat{A}=(A_i-A_{i-1})$, where $A_i$ is the current measurement and $A_{i-1}$ is the previous measurement is used to approximate $A_G$.

Typically, non-gravity acceleration $d\hat{A}$ may be represented by a three-dimensional vector with components in each of the X-Y-Z cardinal directions with respect to a body reference system of the mobile device as $d\hat{A}=d\hat{A}_X+d\hat{A}_Y+d\hat{A}_Z$. If necessary, the in-flight computation logic 400 may us a translation matrix to translate between the body reference system and a local reference system, where the local reference system includes a vertical component (in line with gravitational acceleration $A_G$), a transversal component (in line with level flight) and a lateral component (perpendicular to both gravitational and transversal components). In the local reference system, non-gravity acceleration $d\hat{A}$ may be represented as $d\hat{A}=d\hat{A}_V+(d\hat{A}_T+d\hat{A}_L)$ or $d\hat{A}=d\hat{A}_V+d\hat{A}_H$, where $d\hat{A}_T$ represents the transversal acceleration, $d\hat{A}_L$ represents the lateral acceleration, and the sum of the two vectors represents the horizontal or non-gravitational acceleration orthogonal to the gravity estimate and may be represented as $d\hat{A}_H=d\hat{A}_T+d\hat{A}_L$.

The vector splitter 450 accepts both the non-gravity acceleration estimate $d\hat{A}$ and the gravity direction estimate $\hat{u}_G$. The vector splitter 450 acts as a means for splitting the difference acceleration $(d\hat{A})$ into orthogonal components comprising an estimated horizontal acceleration $(d\hat{A}_H)$ and an estimated vertical acceleration $(d\hat{A}_V)$ based on an estimated direction of gravitational acceleration. That is, the vector splitter 450 separates the vector $d\hat{A}$ into a first component $d\hat{A}_V$, which is parallel to $\hat{u}_G$ (in line with the estimated gravity), and a second component $d\hat{A}_H$, which is orthogonal to $\hat{u}_G$ (perpendicular to the estimated gravity). The vector splitter 450 provides $d\hat{A}_V$ and $d\hat{A}_H$, which are used for performing one or more test to determine if the mobile device 100 is in flight and/or not in flight.

A first comparator 460 is used for a first test (Test A) to determine whether the acceleration $dA$ is sufficiently above a threshold to constitute significant non-gravity acceleration. The first comparator 460 may be implemented in hardware or software. For example, the first comparator 460 may be a comparison operator running in a processor 300. The first comparator 460 acts as a means for comparing an acceleration comprising a vertical acceleration with a first threshold $(Th_1)$ to determine a first comparison result or Test A decision. That is, the first comparator 460 compares a magnitude of $d\hat{A}_V$ to a threshold $Th_1$. If $|d\hat{A}_V|>Th_1$, then Test A results in a positive decision.

A second comparator 470 is used for a second test (Test B) to determine whether the acceleration $d\hat{A}$ is sufficiently vertical to constitute significant vertical acceleration. As with the first comparator 460, the second comparator 470 may be implemented in hardware or software. The second comparator 470 acts as a means for comparing at least one of the orthogonal components $\{d\hat{A}_H, d\hat{A}_V\}$ with a second threshold $(Th_2)$ to determine a second comparison result or Test B decision. The second comparator 470 compares a magnitude of $d\hat{A}_V$ and a magnitude of $d\hat{A}_H$. If $|d\hat{A}_V|>|d\hat{A}_H|$, then Test B results in a positive decision. In other embodiments, a second threshold $Th_2$ is compared to a ratio of the magnitude of $d\hat{A}_V$ and the magnitude of $d\hat{A}_H$. If $|d\hat{A}_V|/|d\hat{A}_H|>Th_2$, then Test B results in a positive decision.

A gate 480 receives the results from both tests and provides a resulting in-flight indicator signal. The gate 480 acts as a means for setting an in-flight indicator based on the first and second comparison results. Depending on the polarity of the input values (comparison results representing the Test A decision and the Test B decision) and the desired polarity of the output values (in-flight indicator), the gate 480 may be implemented with an AND gate, OR gate, NAND gate or NOR gate with or without one or more inverters. The gate 480 may be implemented in hardware or software, for example, as an arithmetic expression in firmware running on a processor.

As indicated, the above-described modules may be implemented individually or in combination as software instructions. These software instructions may be saved as program code on a computer-readable medium for later execution on a processor 300. Furthermore, a mobile device 100 may include a processor 300 and memory 120, wherein the memory 120 includes these software instructions to execute one or more of these modules.

Similarly, in FIG. 10B, an accelerometer 110 provides samples to in-flight computation logic 400, which generates an in-flight indicator signal. In addition to an averager 410, a delay T unit 420, a difference unit 430, a vector splitter 450, first and second comparators 460 and 470 and a logic gate 480, the in-flight computation logic 400 also includes a low-pass filter 490. The averager 410, a delay T unit 420, a difference unit 430, first and second comparators 460 and 470, and a logic gate 480 are equivalent to the corresponding modules described above with reference to FIG. 10A. The gravity direction estimator 440 of FIG. 10A is implemented with a tap of the averaged sample $A_i$ 220 from the averager 410 to the vector splitter 450. The vector splitter 450 performs the same operations as described above but with appropriate scaling due to vector $A_i$ begin used rather than the unit vector $\hat{u}_G$. The output value from gate 480 is an unfiltered in-flight indicator signal. A low-pass filter 490 accepts a sequence of these values to produce a filtered in-flight indicator. In some embodiments, the low-pass filter 490 provides one output value for each input value, for example, at a rate of $1/(t_i-t_{i-1})$. In other embodiments, the low-pass filter 490 provides one output value each time a change between in flight and not in flight is determined. In other embodiments, the low-pass filter 490 provides one output value each time a request is made for an in-flight indication.

FIG. 11 shows various modules and functional components of a mobile device 100, including an accelerometer 110, in-flight computational logic 400, control logic 140, memory 120, a display 130, stand-by circuitry 150 and a timer 160. The in-flight computational logic 400 and control logic 140 may both be implemented as software routines running a processor 300 (e.g., on general purpose or specialized hardware, or in a combination of software and hardware).

The in-flight computational logic 400 accepts averaged samples $A_i$ from the accelerometer 110. In the case shown, the accelerometer 110 provides averaged samples 220 rather than raw samples 200 to the in-flight computational logic 400. Alternatively, the accelerometer 110 may provide raw samples 200 to the in-flight computational logic 400, which may perform averaging as described above. The in-flight computational logic 400 provides an in-flight indicator signal to the control logic 140.

The in-flight indicator signal, which may be a register value, a location in memory, or a binary signal level on a hardware line, may be used for one of several purposes. For example, the control logic 140 may save the in-flight indicator signal to memory 120 as a logging message. The logging messages may be extracted from memory 120 at a later time to track and determine when the mobile device 100 was in flight. Alternatively or additionally, the control logic 140 may send an indicator to a display 130, such as an LCD, LED or other user display, to give a user of the mobile device notice of the mobile device's state. The control logic 140 may control power to circuitry 150 based on the value of the in-flight indicator signal. For example, control logic 140 may power up some circuitry when the in-flight indicator signal indicates the mobile device 100 is in flight and/or may power up some circuitry when the in-flight indicator signal indicates the mobile device 100 is not in flight. Similarly, the control logic 140 may power down some circuitry or put it in a low-power state when the in-flight indicator signal indicates the mobile device 100 is in flight. For example, the control logic 140 may power down or inhibit a cellular radio transceiver and/or a GPS receiver when the in-flight indicator signal indicates the mobile device 100 is in flight and/or may restore power when the signal indicates the mobile device 100 is not in flight. Additionally, the control logic 140 may start, stop, clear or reset a timer in timer 160 based on the value of the in-flight indicator signal or may query the in-flight computation logic 400 for the current in-flight status.

Figure 12:
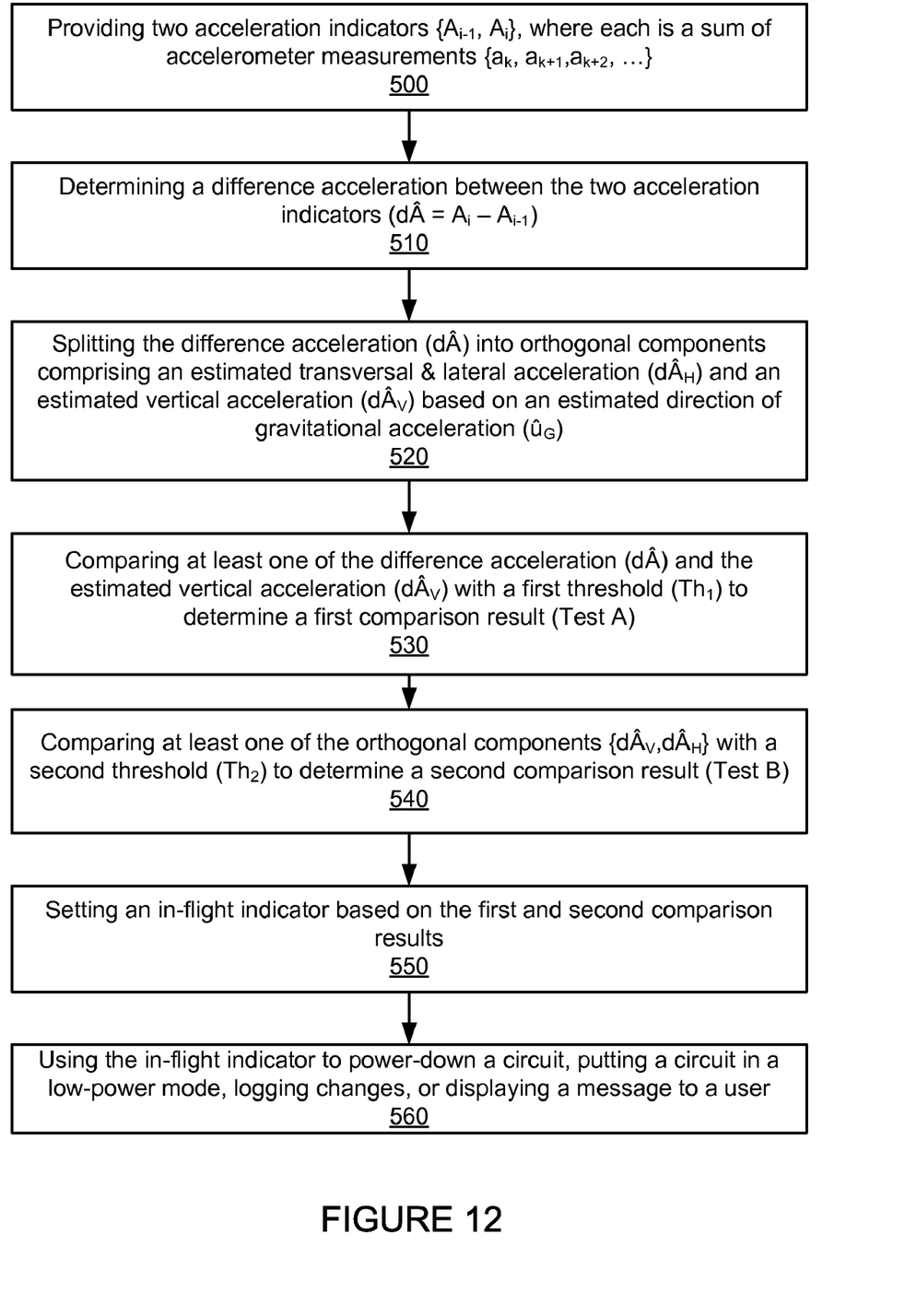
FIG. 12 depicts a flow diagram, in a mobile device, for in-flight detection, in accordance with some embodiments of the present invention.

FIG. 12 depicts a flow diagram, in a mobile device, for in-flight detection, in accordance with some embodiments of the present invention. Steps in the flow diagram may be software modules or operations running on a processor 300.

At 500, the in-flight computation logic 400 provides two acceleration indicators $\{A_{i-1}, A_i\}$, where each is a separate sum of corresponding accelerometer measurements $\{a_k, a_{k-1}, a_{k-2}, \ldots\}$.

At 510, the in-flight computation logic 400 determines a difference acceleration between the two acceleration indicators $(d\hat{A}=A_i-A_{i-1})$ to approximate a change in acceleration from time $t_{i-1}$ to time $t_i$.

At 520, the in-flight computation logic 400 splits the difference acceleration $(d\hat{A})$ into orthogonal components comprising an estimated horizontal acceleration $(d\hat{A}_H)$ and an estimated vertical acceleration $(d\hat{A}_V)$ based on an estimated direction of gravitational acceleration, where the gravity estimate is $\hat{u}_G$ and $\hat{u}_G$ is a function of one or more acceleration indicators $\{A_{i-1}, A_i\}$.

At 530, the in-flight computation logic 400 determines whether the acceleration $d\hat{A}$ is sufficiently above a threshold to constitute significant non-gravity acceleration. In some embodiments, a first comparator 460 compares a difference acceleration (either $d\hat{A}$ or $d\hat{A}_V$) with a first threshold ($Th_1$) to determine a first comparison result (Test A).

At 540, the in-flight computation logic 400 determines whether the acceleration $d\hat{A}$ is sufficiently vertical to constitute significant vertical acceleration. In some embodiments, a second comparator 470 compares at least one of the orthogonal components $\{d\hat{A}_H \& d\hat{A}_V\}$ with a second threshold ($Th_2$) to determine a second comparison result (Test B). If $Th_2=1$, the comparison may be a comparison between magnitudes of the orthogonal components $\{d\hat{A}_H \& d\hat{A}_V\}$.

At 550, the in-flight computation logic 400 sets an in-flight indicator based on the first and second comparison results.

At 560, the in-flight computation logic uses the in-flight indicator to perform an operation, such as write to memory, change a power state a circuit, display a message to a user, affect a timer or the like.

Embodiments of the mobile device include a processor and a memory wherein the memory includes software instructions to detect if the mobile device is in-flight. Furthermore, this software may be stored as program code on a computer-readable medium.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method, in a mobile device, for in-flight detection, the method comprising:
   providing two acceleration indicators $\{A_{i-1}, A_i\}$;
   determining, by the mobile device, a difference acceleration $(d\hat{A})$ between the two acceleration indicators $\{A_{i-1}, A_i\}$;
   splitting, by the mobile device, the difference acceleration $(d\hat{A})$ into orthogonal components comprising an estimated horizontal acceleration $(d\hat{A}_H)$ and an estimated vertical acceleration $(d\hat{A}_V)$ based on an estimated direction of gravitational acceleration;
   comparing, by the mobile device, an acceleration value comprising a vertical acceleration with a first threshold ($Th_1$) to determine a first comparison result;
   comparing, by the mobile device, a value comprising the estimated horizontal acceleration $(d\hat{A}_H)$ with a second threshold ($Th_2$) to determine a second comparison result; and
   setting, by the mobile device, an in-flight indicator, indicating whether the mobile device is in flight within an airplane, based on the first and second comparison results.

2. The method of claim 1, wherein the two acceleration indicators $\{A_{i-1}, A_i\}$ each comprise a three-dimensional acceleration vector.

3. The method of claim 1, wherein the two acceleration indicators $\{A_{i-1}, A_i\}$ comprises:
   a first acceleration ($A_i$) of the two acceleration indicators $\{A_{i-1}, A_i\}$ comprises a sum of a first sequence of sequential accelerometer measurements $\{a_j, a_{j-1}, a_{j-2}, \ldots\}$; and
   a second acceleration ($A_{i-1}$) of the two acceleration indicators $\{A_{i-1}, A_i\}$ comprises a sum of a second sequence of sequential accelerometer measurements $\{a_k, a_{k-1}, a_{k-2}, \ldots\}$.

4. The method of claim 1, wherein the two acceleration indicators $\{A_{i-1}, A_i\}$ comprises:
   a first acceleration ($A_{i-1}$) of the two acceleration indicators $\{A_i, A_{i-1}\}$ indicates an acceleration at a first time ($t_{i-1}$); and
   a second acceleration ($A_i$) of the two acceleration indicators $\{A_i, A_{i-1}\}$ indicates an acceleration at a second time ($t_i$);

wherein a difference in time between the second time ($t_i$) and the first time ($t_{i-1}$) is less than 10000 seconds.

5. The method of claim 4, wherein the difference in time between the second time ($t_i$) and the first time ($t_{i-1}$) is between 1 to 30 seconds.

6. The method of claim 1, wherein the estimated direction of gravitational acceleration comprises a first acceleration ($A_i$) of two acceleration indicators $\{A_{i-1}, A_i\}$ wherein the first acceleration ($A_{i-1}$) represents an earlier acceleration than a second acceleration ($A_i$).

7. The method of claim 1, wherein the estimated direction of gravitational acceleration comprises a second acceleration ($A_i$) of two acceleration indicators $\{A_{i-1}, A_i\}$ wherein the second acceleration ($A_i$) represents a later acceleration than a first acceleration ($A_{i-1}$).

8. The method of claim 1, wherein the estimated direction of gravitational acceleration comprises an average acceleration based on the two acceleration indicators $\{A_{i-1}, A_i\}$.

9. The method of claim 1, wherein the act of comparing the acceleration comprising the vertical acceleration comprises comparing the difference acceleration (dÂ) with the first threshold ($Th_1$).

10. The method of claim 1, wherein the act of comparing the acceleration comprising the vertical acceleration comprises comparing the estimated vertical acceleration ($d\hat{A}_V$) with the first threshold ($Th_1$).

11. The method of claim 1, wherein the act of comparing the value comprising the estimated horizontal acceleration ($d\hat{A}_H$) with the second threshold ($Th_2$) comprises comparing the estimated horizontal acceleration ($d\hat{A}_H$) with the second threshold ($Th_2$).

12. The method of claim 1, wherein the act of comparing the value comprising the estimated horizontal acceleration ($d\hat{A}_H$) with the second threshold ($Th_2$) comprises comparing the second threshold ($Th_2$) to a ratio of the orthogonal components $\{d\hat{A}_H, d\hat{A}_V\}$.

13. The method of claim 1, wherein the act of comparing the value comprising the estimated horizontal acceleration ($d\hat{A}_H$) with the second threshold ($Th_2$) comprises comparing the estimated horizontal acceleration ($d\hat{A}_H$) to the estimated vertical acceleration ($d\hat{A}_V$).

14. The method of claim 1, further comprising displaying a message to a user based on the in-flight indicator.

15. The method of claim 1, further comprising disabling circuitry base on the in-flight indicator.

16. The method of claim 1, further comprising putting circuitry into a low power mode base on the in-flight indicator.

17. The method of claim 1, wherein the act of setting the in-flight indicator based on the first and second comparison results comprises filtering a series of in-flight indicators.

18. The method of claim 1, wherein the act of setting the in-flight indicator based on the first and second comparison results comprises performing a logical AND operation using the first and second comparison results.

19. A mobile device for in-flight detection, the device comprising:
an accelerometer providing raw samples;
an averager coupled to the accelerometer to receive the raw sample and provide averaged samples;
a delay T unit coupled to the averager to receive the averaged samples;
a difference unit coupled to the averager and the delay T unit to compute and provide a difference acceleration;
a gravity direction estimator coupled to the accelerometer to provide an estimate of a direction of gravity;
a vector splitter coupled to the difference unit and gravity direction estimator to find a vertical component and a horizontal component of the difference acceleration;
a first comparator coupled to a first threshold and coupled to the vector splitter to receive the vertical component and to provide a first comparison result;
a second comparator coupled to the vector splitter to receive the vertical component and the horizontal component and to provide a second comparison result; and
a logic gate coupled to the first and second comparators to process the first and second comparison results into an in-flight indicator, indicating whether the mobile device is in flight within an airplane.

20. A mobile device for in-flight detection, the device comprising:
means for providing two acceleration indicators $\{A_{i-1}, A_i\}$;
means for determining a difference acceleration (dÂ) between the two acceleration indicators $\{A_{i-1}, A_i\}$;
means for splitting the difference acceleration (dÂ) into orthogonal components comprising an estimated horizontal acceleration ($d\hat{A}_H$) and an estimated vertical acceleration ($d\hat{A}_V$) based on an estimated direction of gravitational acceleration;
means for comparing an acceleration comprising a vertical acceleration with a first threshold ($Th_1$) to determine a first comparison result;
means for comparing a value comprising the estimated horizontal acceleration ($d\hat{A}_H$) with a second threshold ($Th_2$) to determine a second comparison result; and
means for setting an in-flight indicator, indicating whether the mobile device is in flight within an airplane, based on the first and second comparison results.

21. The device of claim 20, further comprising means for summing a first sequence of sequential accelerometer measurements $\{a_j, a_{j-1}, a_{j-2}, \ldots\}$ and for summing a second sequence of sequential accelerometer measurements $\{a_k, a_{k-1}, a_{k-2}, \ldots\}$ to form the two acceleration indicators $\{A_i, A_{i-1}\}$.

22. A device comprising a processor and a memory wherein the memory includes software instructions to:
provide two acceleration indicators $\{A_{i-1}, A_i\}$;
determine a difference acceleration (dÂ) between the two acceleration indicators $\{A_{i-1}, A_i\}$;
split the difference acceleration (dÂ) into orthogonal components comprising an estimated horizontal acceleration ($d\hat{A}_H$) and an estimated vertical acceleration ($d\hat{A}_V$) based on an estimated direction of gravitational acceleration;
compare an acceleration comprising a vertical acceleration with a first threshold ($Th_1$) to determine a first comparison result;
compare a value comprising the estimated horizontal acceleration ($d\hat{A}_H$) with a second threshold ($Th_2$) to determine a second comparison result; and
set an in-flight indicator, indicating whether the device is in flight within an airplane, based on the first and second comparison results.

23. A non-transitory computer-readable medium including program code stored thereon, comprising program code to:
provide two acceleration indicators $\{A_{i-1}, A_i\}$;
determine a difference acceleration (dÂ) between the two acceleration indicators $\{A_{i-1}, A_i\}$;
split the difference acceleration (dÂ) into orthogonal components comprising an estimated horizontal acceleration ($d\hat{A}_H$) and an estimated vertical acceleration ($d\hat{A}_V$) based on an estimated direction of gravitational acceleration;

compare an acceleration comprising a vertical acceleration with a first threshold ($Th_1$) to determine a first comparison result;

compare a value comprising the estimated horizontal acceleration ($d\hat{A}_H$) with a second threshold ($Th_2$) to determine a second comparison result; and set an in-flight indicator, indicating whether a device is in flight within an airplane, based on the first and second comparison results.

* * * * *